US008549573B2

(12) United States Patent
Velusamy et al.

(10) Patent No.: US 8,549,573 B2
(45) Date of Patent: Oct. 1, 2013

(54) MEDIA QUALITY MONITORING

(75) Inventors: Umashankar Velusamy, Tampa, FL (US); George L. Hughes, Wesley Chapel, FL (US); Bhaskar R. Gudlavenkatasiva, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 12/958,643

(22) Filed: Dec. 2, 2010

(65) Prior Publication Data

US 2012/0144415 A1 Jun. 7, 2012

(51) Int. Cl.
*H04N 7/173* (2011.01)
*G06F 11/00* (2006.01)

(52) U.S. Cl.
USPC ............... 725/107; 725/14; 725/118; 714/46; 714/57

(58) Field of Classification Search
None
See application file for complete search history.

(56) References Cited

U.S. PATENT DOCUMENTS

| | | | | |
|---|---|---|---|---|
| 8,171,351 | B1 * | 5/2012 | Tomay et al. | 714/48 |
| 8,296,605 | B2 * | 10/2012 | John | 714/38.1 |
| 2004/0244056 | A1 * | 12/2004 | Lorenz et al. | 725/135 |
| 2007/0162932 | A1 * | 7/2007 | Mickle et al. | 725/37 |
| 2007/0271590 | A1 * | 11/2007 | Gulas et al. | 725/118 |
| 2010/0313230 | A1 * | 12/2010 | Van Doorn et al. | 725/107 |
| 2011/0090346 | A1 * | 4/2011 | Pham et al. | 348/180 |

* cited by examiner

*Primary Examiner* — Chris Parry
*Assistant Examiner* — Oschta Montoya

(57) ABSTRACT

A content processing device is configured to receive a media stream via a network. The media stream may be analyzed to detect whether an anomaly is present in the media stream indicative of a potential quality defect in playback of the media stream. Data relating to a detected anomaly may be provided to a destination via the network.

24 Claims, 6 Drawing Sheets

MEDIA QUALITY MONITORING

BACKGROUND INFORMATION

From the standpoint of both a media provider and its customers, the quality of media, e.g., audio, video, etc., is very important. From the standpoint of the customer, high-quality media services are critical to enjoying and obtaining full benefit from the media services. From the standpoint of the media provider, particularly in today's competitive media market, providing poor quality media services can be very detrimental to the provider's business. For example, a customer experiencing issues such as frozen frames, blacked out frames, missing audio, pixilation, etc. may easily choose to switch to a different media provider. Sometimes, customers experiencing such issues will not even bother to report the issues to the media provider before switching to another media provider. Moreover, even if a customer does report an issue, by the time the customer does so, the relationship with the media provider may already be severely damaged. However, present mechanisms for resolving quality issues in a media network generally rely on a customer to report a problem. Further, present monitoring may occur at a location in a network other than at a customer location, e.g., at a head end or central office, and therefore may not accurately reflect the quality of media being provided to the customer.

DETAILED DESCRIPTION OF PREFERRED EMBODIMENTS

Figure 1:
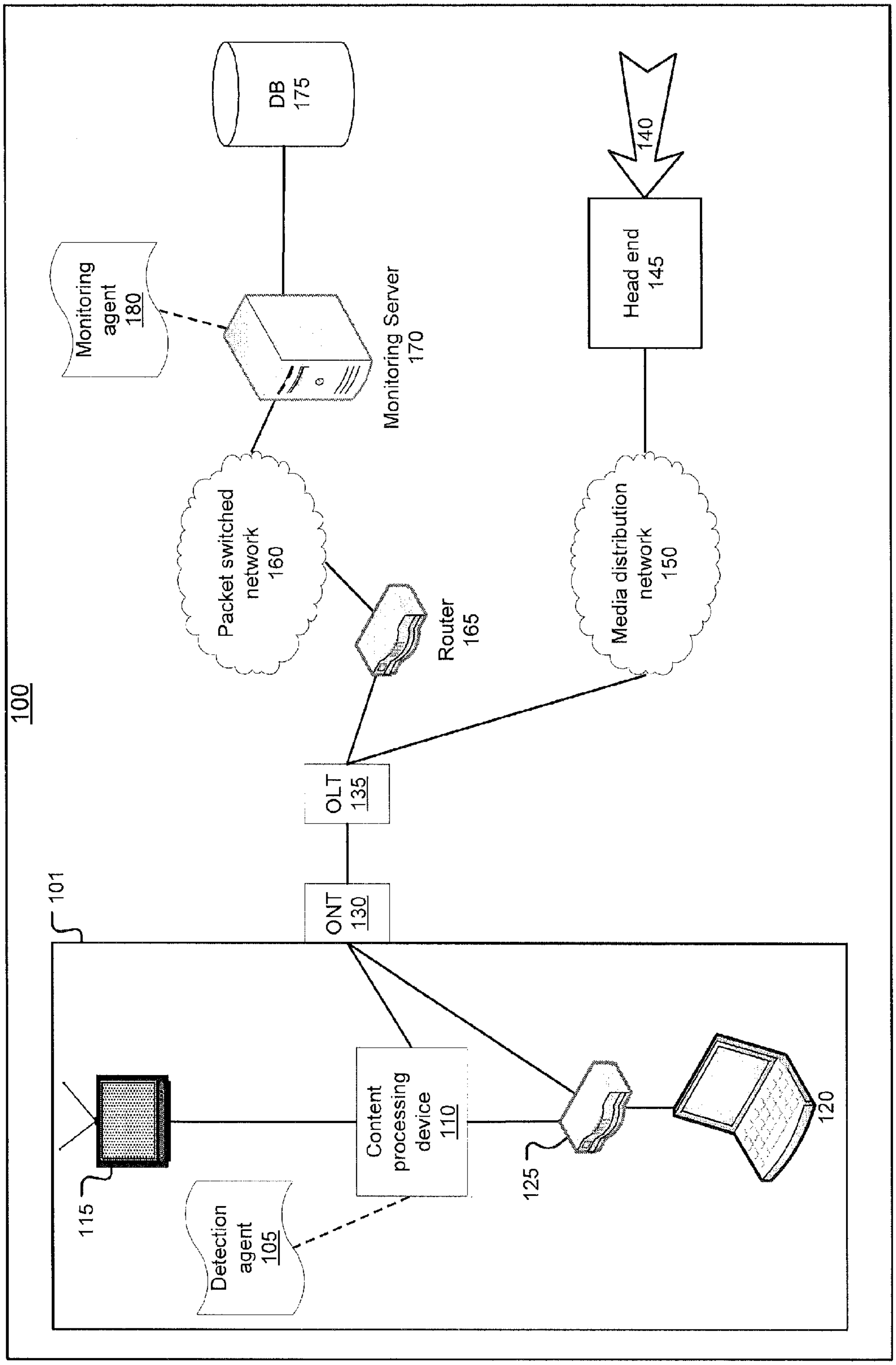
FIG. 1 illustrates an exemplary system for providing media to a customer premises.

FIG. 1 illustrates an exemplary system 100 that includes a customer premises network 101 in which media content, including any combination of images, audio, video, etc., may be provided to a media playback device 115 through a content processing device 110 attached to the customer premises network 101. A detection agent 105, e.g., a module of computer-executable instructions included in a computer-readable medium of content processing device 110, may be used to provide data relating to media content to a monitoring server 170. A monitoring agent 180, e.g., a module of computer-executable instructions included in a computer-readable medium of the monitoring server 170, may be used to analyze the data from the content processing device 110, and to make at least one determination concerning a quality of media provided to the content processing device 110 based on the data.

As illustrated in FIG. 1, customer premises network 101 includes devices within a customer premises including content processing device 110. Content processing device 110 may be a set top box (STB) or similar device known for receiving a media signal from a network and for providing media programming, e.g., audio, video, etc., to a media playback device 115. For example, content processing device 110 may be manufactured by Motorola, Inc. of Schaumburg, Illinois. Content processing device 110 may be controlled by a user through a remote control or the like, thereby facilitating the selection and playing of content through media playback device 115.

In addition to detection agent 105, content processing device 110 may include a mechanism for storing a stream of a data provided to playback device 115, e.g., a loopback buffer or the like may be used to store a stream of data for a period of time, e.g., thirty seconds. Data stored by content processing device 110, e.g., in a loopback buffer, may then be provided to monitoring server 170, e.g., upon request of a user of the monitoring server 170, accompanying a report by detection agent 105 of an event potentially indicative of a quality issue, etc.

Media playback device 115 may include a variety of equipment alone or in combination, such as a video receiver, including a conventional television or a hi-definition television (HDTV), audio equipment including an amplifier and speakers, or devices that incorporate the capability to simultaneously process both video and audio data, etc. Media playback device 115 may be connected to, and receive multimedia content from, content processing device 110 in a known manner.

Detection agent 105, which usually runs on content processing device 110, includes computer-executable instructions that are generally stored in a computer-readable medium, e.g., a memory, of content processing device 110, and that may be executed by a processor included within content processing device 110. A process for using detection agent 105 is discussed below with reference to FIG. 2. In general, detection agent 105 is operable to detect quality problems in media, e.g., video, provided via content processing device 110, e.g., to media playback device 115. For example, agent 105 may detect anomalies such as frozen frames, pixilation, missing audio, blacked out frames, etc., even without user intervention. Upon detection of certain events, e.g., an event that may be related to a quality problem, detection agent 105 generally transmits data related to the event to a monitoring server 170, as described further below. Additionally or alternatively, as mentioned above, data from a loopback buffer or the like in content processing device 110 may be provided to server 170.

Further, although detection agent 105 is generally referred to herein as being included on content processing device 110, detection agent 105 could be included on monitoring server 170, or some other server, e.g., a device located at a server delivering a media stream through network 160, or at a head end 145 delivering content via a network 150. In such case, anomalies could be detected before a media stream is delivered to a customer premises 101. Further, it is possible that, when an anomaly is detected, detection agent 105 could be configured to insert metadata into a media stream to in effect wore the device 110 of the anomaly, so that corrective action may be taken. For example, the device 110 could be warned to ignore dropped frames.

A router 125 may be used for establishing and operating, or at least connecting to, a network such as a home network or local area network (LAN), and may be used to route communications within customer premises network 101. Router 125 provides for connection not only of one or more computing devices 120, but also allows for connection of content processing device 110. For example, content processing device 110 may be a set-top box connected to router 125 by a coaxial cable, while computing devices 120 may be connected to router 125 using a wireless connection, a network cable such as a "Cat5" cable, or the like. Further, content processing device 110 and computing device 120 are uniquely or substantially uniquely identified by router 125 in a known manner. For example, Dynamic Host Configuration Protocol (DHCP) could be used to dynamically assign "private" DHCP Internet Protocol (IP) addresses to content processing device 110 and computing devices 120, i.e., IP addresses that are only accessible to devices such as devices 110 and 120 that are on customer premises network 101, i.e., directly connected to router 125. Note that router 125 may be omitted, and content processing device may communicate with an optical network terminal (OLT) 130, described below.

Content processing device 110 may receive media content via a media distribution network 150, i.e., a network for providing media transmissions, e.g., a video signal 140. For example, network 150 may include hardware and software for providing video signal 140 via coaxial cable and/or fiber optic cable. Video signal 140 is generally provided to a media distribution network 150 from a head end 145.

Content processing device 110 selectively communicates with gateway router 165 to send information to, and receive information from, a packet switched network 160. The monitoring server 170 also selectively communicates with router 165, generally via a packet protocol such as Internet Protocol (IP), e.g., sometimes via a network 160. A database 175 stores information relating to quality monitoring, e.g., data received from set top boxes 110, and may be included in monitoring server 170, or may be part of a separate server.

Packet switched network 160 is generally an internet protocol (IP) network. As such, network 160 generally uses one or more known protocols for transporting data, such as user datagram protocol (UDP), transport control protocol (TCP), hypertext transfer protocol (HTTP), etc. Further, network 160 may include a variety of networks such as a wide area network (WAN), e.g., the Internet, a local area network (LAN), etc. Packet switched network 160 may be used to transport a variety of data, including multimedia data such as audio data and video data. Accordingly, it is to be understood that it is possible that networks 150 and 160 are in fact combined into a single network, or media distribution network 150 could be simply omitted, wherein packet switched network 160 could be used to provide video signal 140 to content processing device 110.

A gateway router 165 allows content processing device 110 to access packet switched network 160. By communicating with router 165, content processing device 110 is able to obtain a network address such as an internet protocol (IP) address, thereby enabling content processing device 110 to make requests to, and to receive data from, an IPG server 170.

Monitoring agent 180 is generally included within server 170. Monitoring agent 180 includes computer-executable instructions that are generally stored in a computer-readable medium, e.g., a magnetic disk, of server 170, and that may be executed by a processor included within computing device 170. Monitoring agent 180 is generally configured to analyze data received from one or more set top boxes 180 and to provide a determination relating to a quality issue in a customer premises 101, and ONT 130, OLT 135, network 150 or 160, etc.

Fiber optic cable may be used to provide both data and a video signal 140 to customer premises network 101, including to content processing device 110. An optical network terminal (ONT) 130 may be situated adjacent to a customer premises, for the purpose of providing data received over an optical line to customer premises network 101, including content processing device 110. An optical line terminal (OLT) 135 may provide data, including video signal 140, to one or more optical network terminals (ONTs) 130. Accordingly, FIG. 1 illustrates a hybrid network system 100 in which video signal 140 transported over media distribution network 150, and also data transported over packet switched network 160, are received by customer premises network 101 through a fiber optic line. However, as stated above, it is possible that content processing device 110 receives both data and audio/video communications via media other than fiber optic cables to customer premises network 101.

Computing devices such as content processing device 110, computing device 120, server 170, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Content processing device 110 generally is a specialized device for receiving video signals 140 from head end 145 via network 150, and may be provided with a proprietary or specialized operating system other than those enumerated above. For example, content processing device 110 may be an STB provided with a real time operating system (RTOS) or the like. However, it is to be understood that content processing device 110 may be a computing device such as one of those enumerated above, so long as the computing device is capable of receiving video signals 140 from network 150, and also is capable of storing an executing the instructions included in media manager 105. Likewise, a computing device 120 may take the place of display device 115. Further, media playback device 115 and content processing device 110 could be a single device.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
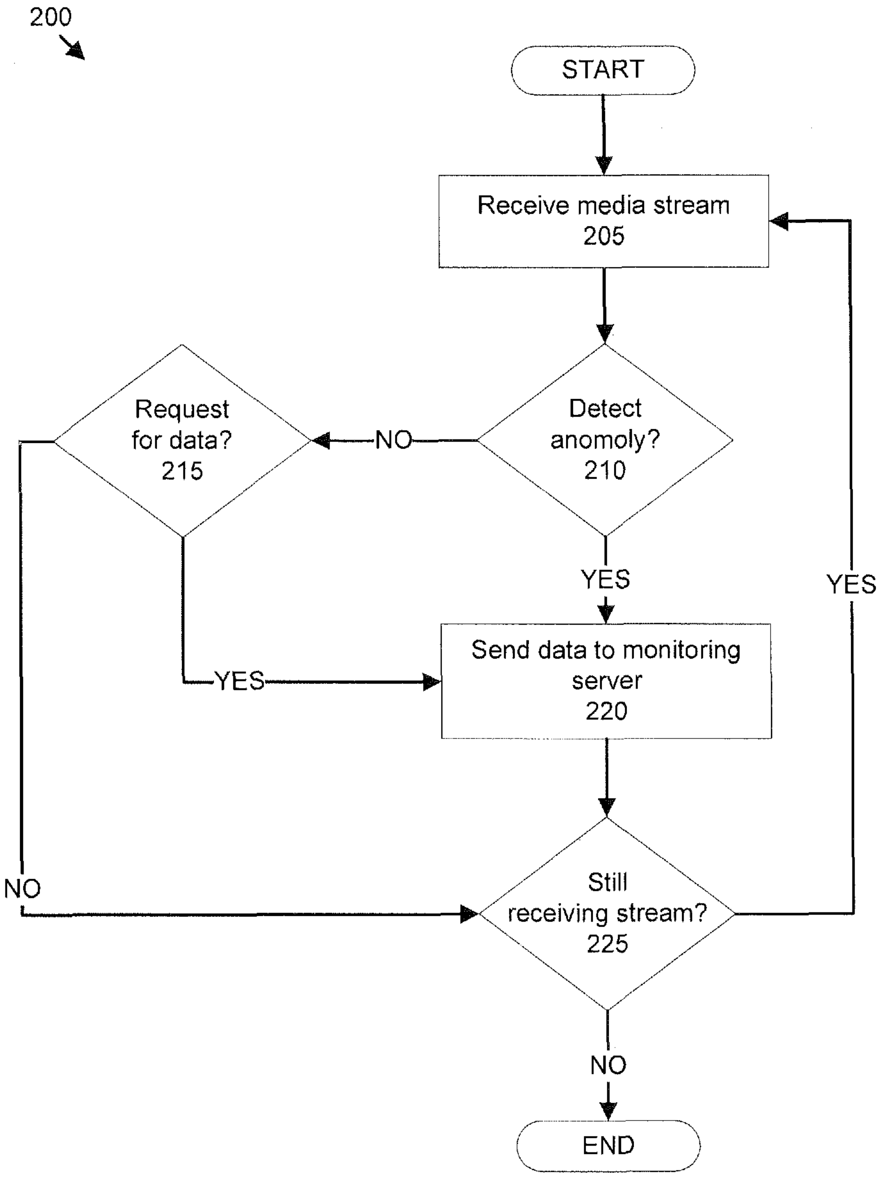
FIG. 2 illustrates an exemplary process monitoring a media stream.

FIG. 2 illustrates an exemplary process 200 for monitoring a media stream. The process 200 begins in a step 205, in which content processing device 110 receives a media stream. As discussed above, a media stream may be provided to content processing device 110 from a media distribution network 150, a packet switched network 160, etc. Further, as also discussed above, a media stream received by a content processing device 110 may be stored in a loopback buffer or the like, i.e., a mechanism for caching a portion of a media stream received over a specified period of time, e.g., 30 seconds.

Next, in step 210, detection agent 105 analyzes data received in step 205, i.e., the media stream possibly including metadata included in the media stream, to determine whether any anomalies potentially related to quality issues may exist, e.g., quality issues that would be reflected in playback of the media stream, such as pixilation illustrated in FIG. 6, discussed below. Detection agent 105 may monitor the media stream in a variety of ways. For example, detection agent 105 may be configured to detect pixilation, dropped packets, delayed packets, occurrences where packets are received more slowly than packets are to be played back to playback device 115, occurrences where no audio is received for a certain period of time (e.g., 60 seconds, four minutes, etc.), frozen frames of video, i.e., occurrences where a single frame of video is repeated for a period of time (e.g., one second), loss of an incoming signal, etc. For example, waveform monitors may be used for detecting anomalies such as frozen frames, indicated by repeated patterns, dropped frames, etc. Anomalies such as pixilation may be detected using pattern recognition and pattern matching techniques. A process 500 for detecting one kind of anomaly, an audio anomaly, is discussed below with respect to FIG. 5.

In the interest of efficiency and reducing overhead in the device 110, detection agent 105 is generally configured to detect more common anomalies rather than all known anomalies, e.g., anomalies known to have occurred in the recent past in the network 160. Further, detection agent 105 may be dynamically configured for detecting new or different anomalies, e.g., instructions to detect an anomaly previously not being looked for could be downloaded from server 170.

If an anomaly is not detected in step 210, step 215 is executed next. Otherwise, process 200 proceeds to step 220.

In step 215, detection agent 105 determines whether content processing device has been requested, e.g., by server 170, to provide data related to the media stream received as described above with respect to step 205. For example, even if an anomaly has not been detected as described with respect to step 210, a technician or other user of server 170 may initiate a request for data for routine monitoring purposes, to investigate a user or other report of a quality issue, etc. If a request for data has been received, step 220 is executed next. Otherwise, step 225 is executed next.

In step 220, detection agent 105 causes data, either data relating to an anomaly detected as described above with respect to step 210, or data requested from server 170 is described with respect to 215, to be sent to server 170. Such data may include statistics and/or other data relating to an anomaly and/or statistics and/or other data relating to a media stream provided over a given period of time, as well as contents of the loopback buffer or other similar mechanism. For example, data provided to server 170 in this step could include a number of packets dropped or delayed, a video or audio channel associated with the data and/or anomaly, an identifier for the content processing device 110, an identifier for network nodes associated with the content processing device 110, such as identifiers for a central office, routers, ONTs 130, OLTs 135, etc., other data identifying one or more anomalies such as those mentioned above, such as a report that a signal has been lost, a frame has been frozen, etc.

Detection agent 105 could provide data in a variety of formats. For example, detection agent 105 could include data relating to an anomaly in a packet header according to some format appropriate for the header. Data from a loopback buffer or the like could similarly or additionally be included. For example, a format of such a packet header could include fields for the following: an address (e.g., IP address) of the relevant device 110, a location (e.g., geolocation such as latitude and longitude coordinates) of the device 110, a customer identifier associated with the premises 101 housing the device 110, an identifier for the device 110, a timestamp associated with the anomaly, or possibly multiple timestamps, e.g., a start time and an end time giving a time period associated with the anomaly, an identifier or brief description specifying the nature of the anomaly, as well as data captured in a loopback buffer.

Note that there may be instances where the nature of an anomaly could not be detected, although an anomaly in fact was detected. In that case, detection agent 105 could provide only loopback buffer contents along with other information, e.g., data identifying a customer associated with the device 110 and other information relating to the device 110, versions of its software, etc. Such data could be further analyzed monitoring agent 180 to determine the nature of the anomaly or create a new classification of an anomaly if appropriate.

In step 225, which may follow either step 215 or step 220, detection agent 105 determines whether content processing device 110 is still receiving the media stream. If not, process 200 ends. Otherwise, process 200 returns to step 205.

Figure 3:
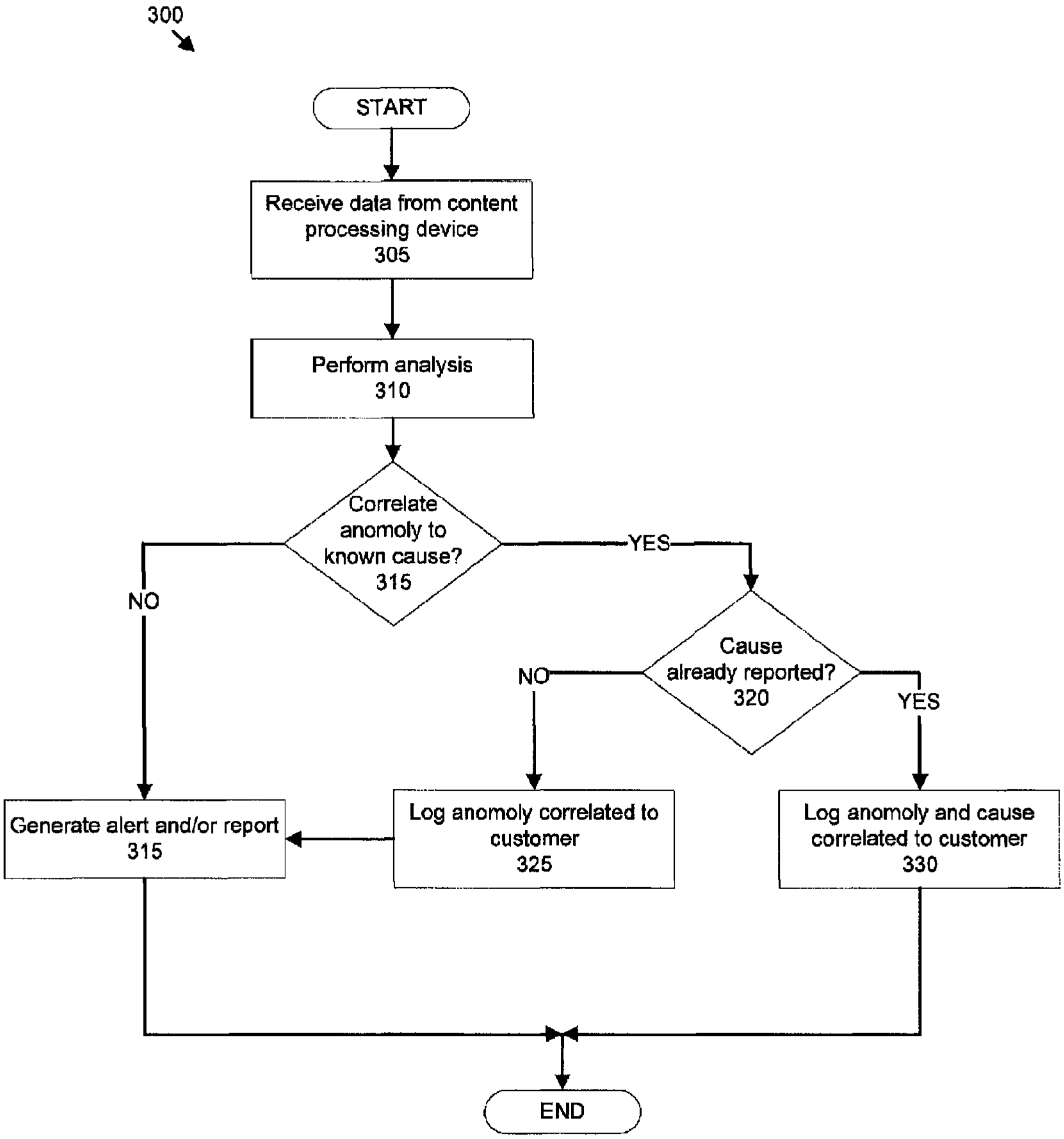
FIG. 3 illustrates an exemplary process for a monitoring server to receive data from a content processing device.

FIG. 3 illustrates an exemplary process for monitoring server 170 to receive data from a content processing device 110. In step 305, monitoring agent 180 in server 170 receives data from a content processing device 110, e.g., as described with respect to step 220 of process 200.

Next, in step 310, monitoring agent 180 analyzes the data received in step 305. Such analysis generally uses data stored in database 175. For example, agent 180 may determine whether anomalies included in the data received in step 305 may be associated with any anomalies associated with network nodes serving the content processing device 110 in question. For example, data in database 175 may indicate power outages or interruptions, corruptions of physical media, transmission delays or outages, etc. associated with network nodes such as router 165, OLT 135, and ONT 130, etc. Thus, by matching patterns or content of data received in step 305 with data in database 175, agent 180 may correlate data received in step 305 with particular node causes of anomalies, and with items in system 100, such as the network nodes mentioned in the previous sentence. An example of monitoring agent 180 looking for and detecting an anomaly is provided as process 500 described below with respect to FIG. 5.

Next, in step 315, monitoring agent 180 determines whether the analysis of step 310 correlated the reported anomaly to any known cause, such as one of those mentioned above. For example, a particular OLT 135 may have been identified as faulty, etc. If a known cause of an anomaly cannot be identified, step 335 is executed next. However, if a known cause is identified, step 320 is executed next.

In step 320, monitoring agent 180 queries database 175 to determine whether the cause identified in step 315 has already been reported and correlated to prior anomalies. This query is generally restricted to a relevant time period, e.g., the past 48 hours, past 72 hours, etc., as well as to a specific geographic area, e.g., a geographic area served by a particular central office or other elements of networks 150 and/or 160. If the cause has been reported, then step 330 is executed next. Otherwise, step 325 is executed next.

In step 325, monitoring agent 180 logs, e.g., in database 175, the anomaly indicated in the data received in step 305 and the cause identified in step 315, correlated to a customer identifier, e.g., an identifier for the customer premises 101 that include the content processing device 110 reporting the data received in step 305. Process 300 then proceeds to step 335.

In step 330, monitoring agent 180 logs, e.g., in database 175, the anomaly indicated in the data received in step 305, correlated to a customer identifier, e.g. an identifier for the customer premises 101 and that included the content processing device 110 reporting to data received in step 305. Also associated with the customer identifier, monitoring agent 180 logs the cause that has been identified and reported as described with respect to step 315 and 320.

In step 335, monitoring agent 180 generates an alert and/or report relating to the data received in step 305. For example, information relating to the data may be provided to a technician via e-mail, could be posted to a webpage, etc. Further, if step 315 correlated any of the data received in step 305 with data stored in database 170 to provide a possible cause of a noted anomoly, such information may also be reported in step 315. Upon receiving such information, a technician may take action, could request further data from content processing device 110, could review video and audio from the loopback buffer or similar mechanism of content processing device 110, etc.

Following step 315, process 300 ends.

Figure 4:
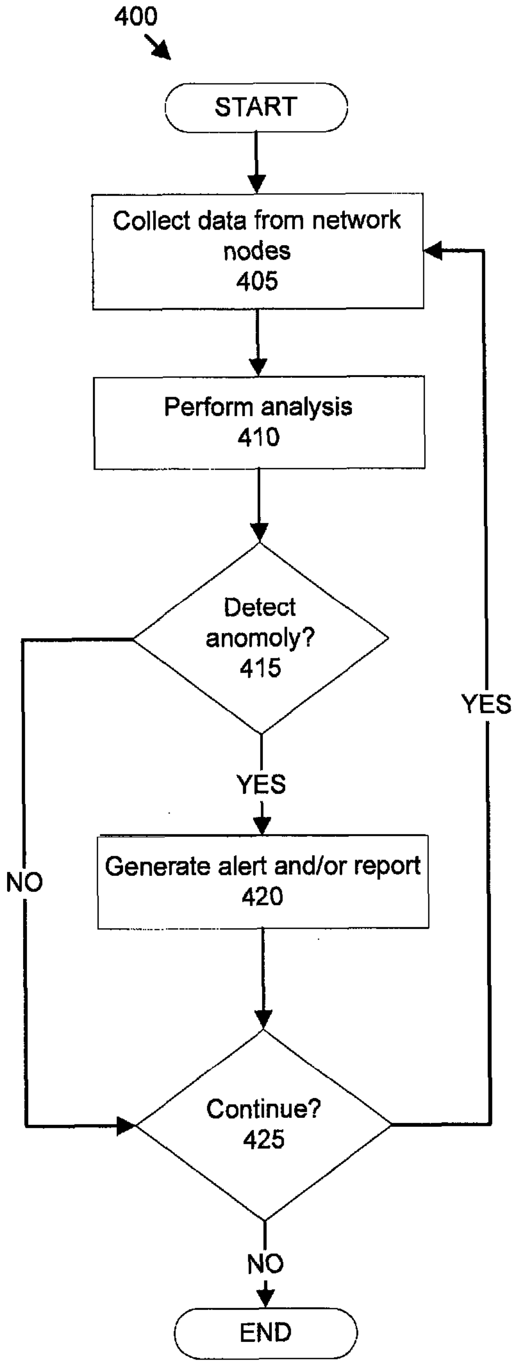
FIG. 4 illustrates an exemplary process for a monitoring server to collect and analyze data related to a network or portion of a network.

FIG. 4 illustrates an exemplary process for a monitoring server 170 to collect and analyze data related to a network 150 and/or 160 or portion thereof Process 400 begins in a step 405, in which monitoring agent 180 in server 170 collects data from various nodes in networks 150 and/or 160 and stores collected data, e.g., in database 175. For example, agent 180 may collect data relating to power outages, delays in transmission, lack of capacity to meet all bandwidth demands, etc.

Next, in step 410, monitoring agent 180 analyzes data collected in step 405, e.g., data stored in database 175. Such analysis may be performed even if a possible anomaly has not been reported from a content processing device 110, e.g., agent 180 may perform analysis of data in database 175 on an ongoing or periodic basis. For example, agent 180 may look for patterns related to degradations of service such as dropped or delayed packets, loss of capacity in a network node such as a central office, router, etc. Such patterns may indicate a quality issue that may be addressed before a customer complaint is received. Moreover, agent 180 may isolate or narrow the potential source of a problem. For example, a problem may be determined to be of a particular geographic scope, e.g., affecting a particular region, city, etc., or may be determined to relate to a particular network item, e.g., a particular OLT 135.

Next, in step 415, monitoring agent 180, based on the analysis performed as described above in step 410, determines whether any anomalies have been detected in the system 100. If so, step 420 is executed next. Otherwise, process 200 proceeds to step 425.

In step 420, monitoring agent 180 provides output indicating that an anomaly in system 100 has been detected that is possibly indicative of a quality issue. For example, an alert or reports may be provided to a system operator, e.g., via e-mail, simple message service (SMS), etc. Alternatively or additionally, reports may be provided on a webpage or the like monitored by a system operator. Process 400 proceeds to step 425 following step 420.

In step 425, monitoring agent 180 determines whether process 400 should continue. For example, a system operator may have provided input to stop or suspend the process 400. If the process 400 should continue, control returns to step 405. Otherwise, the process 400 ends.

Figure 5:
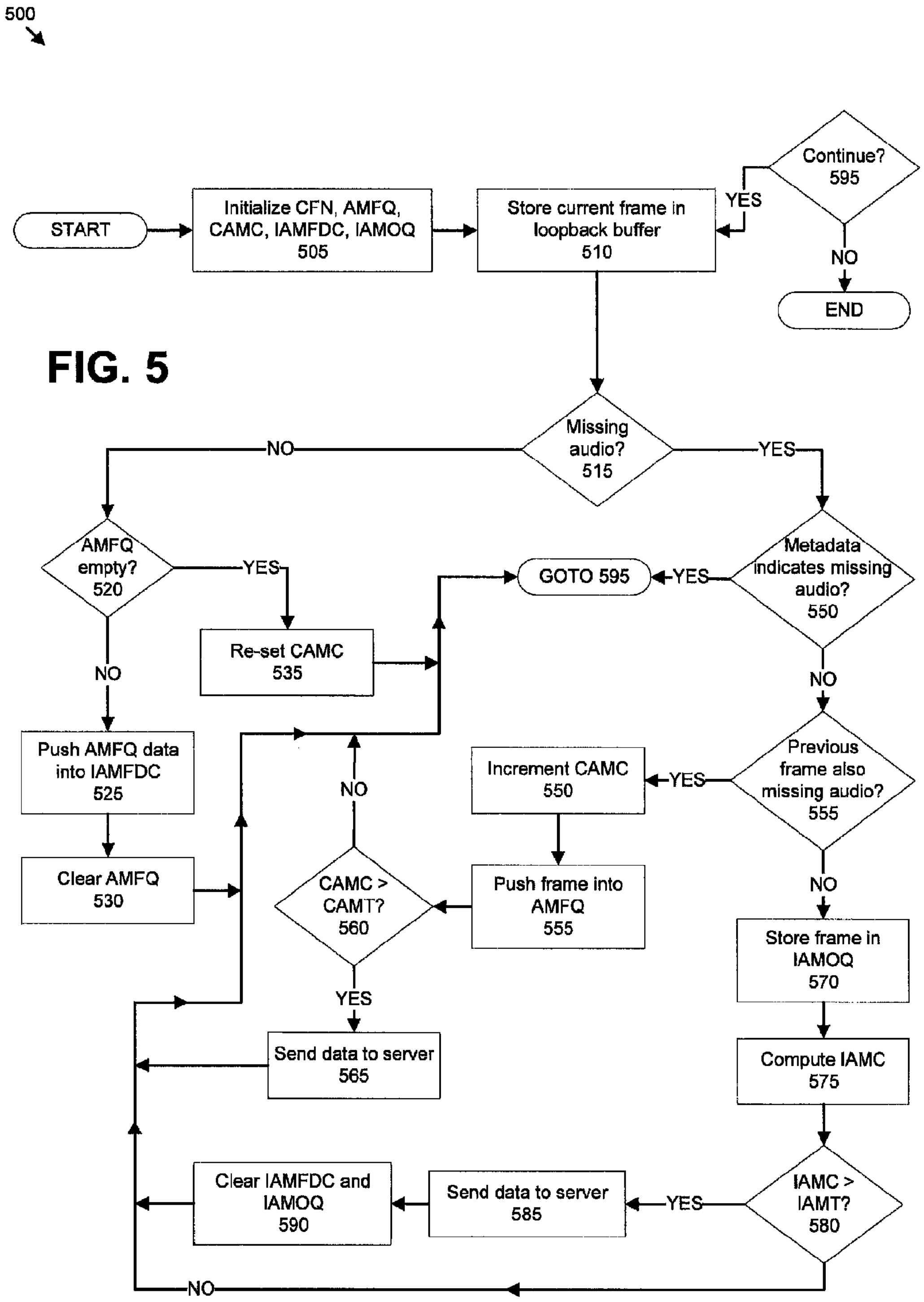
FIG. 5 illustrates an exemplary process for determining whether an audio anomaly exists in a media stream received by a content processing device.

FIG. 5 illustrates an exemplary process 500 for determining whether an audio anomaly exists in a stream of audio-video data received by a content processing device 110. The process 500 begins in a step 505, in which certain variables are initialized, e.g., according to instructions included in detection agent 105, to a value of zero, or empty, as appropriate. These variables may include a Current Frame Number (CFN), an Audio Missing Frame Queue (AMFQ), a Continuous Audio Missing Counter (CAMC), an Intermittent Audio Missing Occurrence Queue (IAMOQ), and an Intermittent Audio Missing Frame Data Container (IAMFDC). CFN is generally an integer value that identifies a current frame being processed. AMFQ is a queue data structure used to track and store frames of audio-video data identified as missing audio data. CAMC generally an integer value that is used to count a number of frames adjacent to one another in the stream of audio-video data that are missing audio data. IAMOQ and IAMFDC are generally data structures used to track and store frames that are missing audio data, as described further below.

Next, in step 510, detection agent 105 stores a current frame of audio-video data, e.g., a frame according to the Motion Picture Experts Group (MPEG) standard, in a loopback buffer of the device 110.

Next, in step 515, detection agent 105 determines whether the frame stored in step 510 lacks any audio data. If not, then step 520 is executed next. However, if the frame does lack audio data, then step 440 is executed next.

In step 520, detection agent 105 determines whether the Audio Missing Frame Queue (AMFQ) is empty, which it will be if step 520 is being visited for the first time, and may be otherwise. If AMFQ is empty, then step 435 is executed next. Otherwise, step 425 is executed next.

In step 525, detection agent 105 pushes AMFQ data into the Intermittent Audio Missing Frame Data Container (IAMFDC).

Following step 525, in step 530, detection agent 105 clears AMFQ, i.e., resets AMFQ to empty. Step 595 is executed following step 530.

In step 535, which follows step 520 if step 425 does not, the Continuous Audio Missing Counter (CAMC) is reset to zero. Step 595 is executed following step 535.

In step 540, which follows step 515 if step 520 does not, detection agent 105 examines the current frame of audio-video data to determine whether metadata indicates that audio should be missing from the frame. If metadata does indicate that audio should be missing, then step 595 is executed following step 540. Otherwise, step 545 is executed next.

In step 545, detection agent 105 determines whether a frame immediately preceding the current frame of audio-video data was also missing audio data. If yes, step 550 is executed next. Otherwise, step 570 is executed next.

In step 550, the CAMC is incremented by a value of one.

Next, in step 555, the current frame is pushed onto the Audio Missing Frame Queue (AMFQ).

Next, in step 560, detection agent 105 determines whether the CAMC is greater than a predetermined threshold referred to as the Continuous Audio Missing Threshold (CAMT). CAMT is generally an integer value representing a number of consecutive frames that may be improperly missing audio before the threshold is exceeded. If CAMC is greater than CAMT, then step 565 is executed next. Otherwise, the process 500 proceeds to step 595.

In step 565, detection agent 105 sends a report to monitoring server 170 to indicate the presence of an anomaly, i.e., improperly missing audio, from the stream of audio-video data being received by the device 110. For example, detection agent 105 may cause contents of the loopback buffer of the device 110, along with other information to identify the nature of an anomaly to be sent to the server 170. Step 595 follows step 565.

In step 570, which follows step 545 if step 550 does not, detection agent 105 stores the current frame of audio-video data in the Intermittent Audio Missing Occurrence Queue (IAMOQ).

Next, in step 575, detection agent 105 computes an Intermittent Audio Missing Count (IAMC) by subtracting from Current Frame Number (CFN) a predetermined Intermittent Audio Missing Threshold (IAMT). IAMT is generally an integer value representing a number of frames that may be intermittently missing from a stream of audio-video data before a threshold is exceeded.

Next, in step 580, detection agent 105 determines whether IAMC is greater than IAMT. If so, step 585 is executed next. Otherwise, the process 500 proceeds to step 595.

In step 585, detection agent 105 sends a report to monitoring server 170 to indicate the presence of an anomaly, i.e., improperly missing audio, from the stream of audio-video data being received by the device 110. For example, detection agent 105 may cause contents of the loopback buffer of the device 110, along with other information to identify the nature of an anomaly to be sent to the server 170. Step 590 follows step 585.

In step 590, detection agent clears the contents of IAMOQ and IAMFDC. Step 595 is executed following step 590.

In step 595, detection agent 105 determines whether the process 500 should continue. For example, the process 500 will end if device 110 stops receiving a stream of audio-video data, or possibly also if some other input is received indicating that the process 500 should stop. If detection agent 105 determines that the process 500 should stop, then the process 500 ends. Otherwise, the process 500 returns to step 510.

Figure 6:
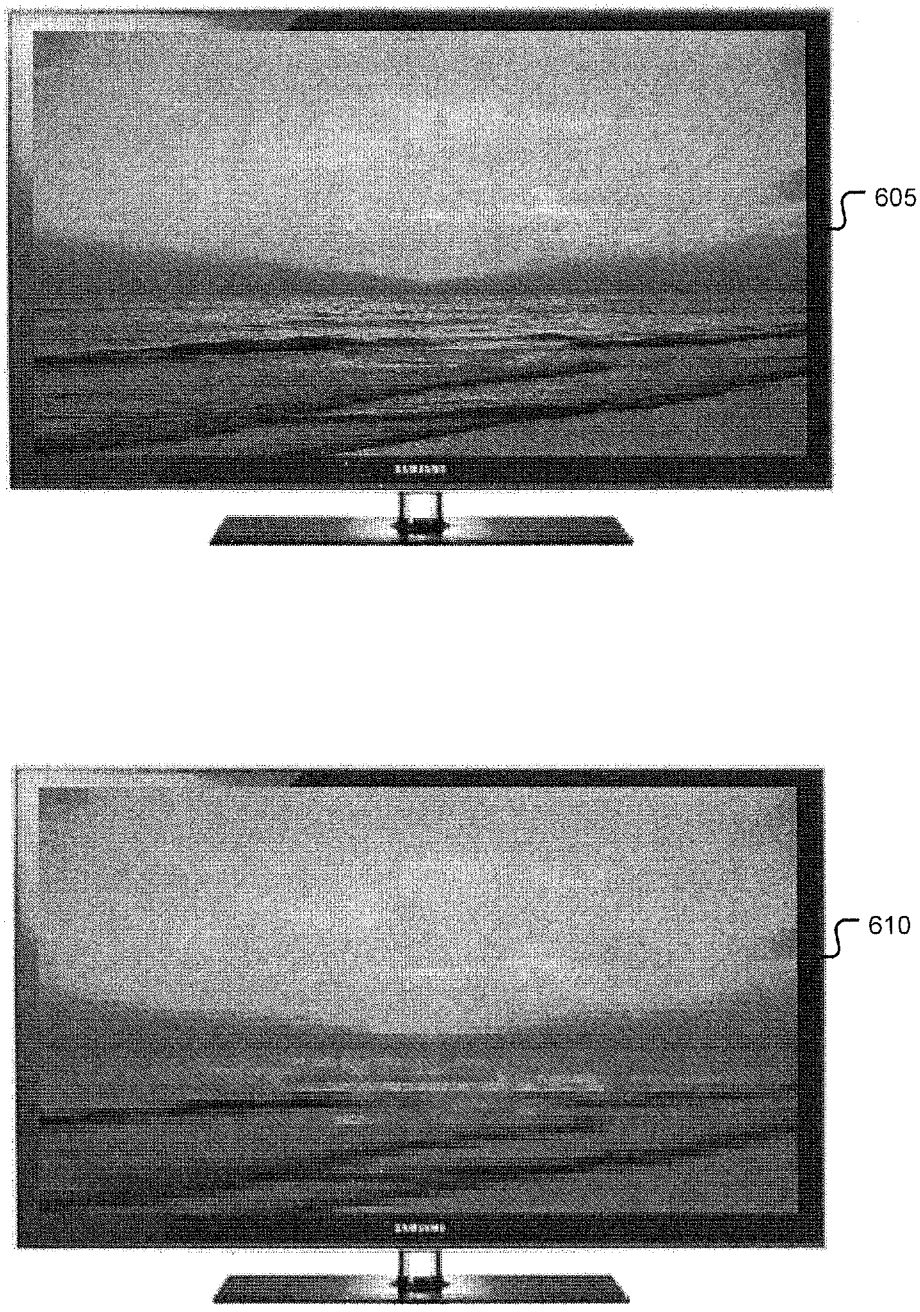
FIG. 6 illustrates respective video images of acceptable and poor quality.

FIG. 6 illustrates respective video images of acceptable and poor quality. A first video image 605 is of acceptable quality, whereas a second video image 610 is a pixilated image of an acceptable quality. Accordingly, content processing device 110 may report anomalies related to the second image 610 to server 170, e.g., lost packets, delays in transmission, etc.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:

a content processing device that is configured to:

receive a media stream via a network;

analyze the media stream to detect whether an anomaly is present in the media stream indicative of a potential quality defect in playback of the media stream and to identify a nature of a detected anomaly;

provide data relating to the detected anomaly, which includes the nature of the anomaly, to a destination via the network; and provide loopback buffer contents along with data associated with the content processing device, as the data relating to the detected anomaly, when the nature of the anomaly is not identified.

2. The system of claim 1, the content processing device being further configured to receive a request for data relating to the media stream from a monitoring server via the network, and to respond to the request by providing to the server data relating to the media stream.

3. The system of claim 1, wherein the content processing device is further configured to analyze the media stream for the anomaly indicative of the potential quality defect by being configured to monitor for at least one of dropped packets, delayed packets, occurrences where packets are received more slowly than packets are to be played back to a playback device, occurrences where no audio is received for a certain period of time, occurrences where a single frame of video is repeated for a period of time, and loss of an incoming signal.

4. The system of claim 1, further comprising a monitoring server that includes a processor and memory, the server configured to receive the data relating to the detected anomaly via the network, wherein the monitoring server is the destination.

5. The system of claim 4, the monitoring server being further configured analyze the data to correlate the anomaly to an item in the network.

6. The system of claim 4, the monitoring server being further configured to provide a report relating to the anomaly.

7. The system of claim 4, wherein a monitoring agent of the monitoring server is configured to, based on the data relating to the detected anomaly, determine the nature of the anomaly or create a new anomaly classification.

8. The system of claim 1, wherein a detection agent of the content processing device is configured to analyze the media stream to detect whether the anomaly is present and the nature of the anomaly, to utilize a waveform monitor to detect the potential quality defect of frozen frames and dropped frames, and to utilize pattern recognition and matching to detect the potential quality defect of pixilation.

9. A method, comprising:

receiving, in a content processing device, a media stream via a network;

analyzing the media stream to detect whether an anomaly is present in the media stream indicative of a potential quality defect in playback of the media stream and identify a nature of a detected anomaly;

providing data relating to the detected anomaly, which includes the nature of the detected anomaly, to a destination via the network; and providing loopback buffer contents along with data associated with the content processing device, as the data relating to the detected anomaly, when the nature of the anomaly is not identified.

10. The method of claim 9, the content processing device being further configured to receive a request for data relating to the media stream from a monitoring server via the network, and to respond to the request by providing to the server data relating to the media stream.

11. The method of claim 9, wherein analyzing the media stream for the anomaly indicative of the potential quality defect includes monitoring for at least one of dropped packets, delayed packets, occurrences where packets are received more slowly than packets are to be played back to a playback device, occurrences where no audio is received for a certain period of time, occurrences where a single frame of video is repeated for a period of time, and loss of an incoming signal.

12. The method of claim 9, further comprising receiving, in a monitoring server that includes a processor and a memory, the data relating to the detected anomaly via the network, wherein the monitoring server is the destination.

13. The method of claim 12, further comprising analyzing the data to correlate the anomaly to an item in the network.

14. The method of claim 12, further comprising providing a report relating to the anomaly.

15. The method of claim 12, wherein a monitoring agent of the monitoring server at least one of determines the nature of the anomaly and creates a new anomaly classification, based on the data relating to the detected anomaly.

16. The method of claim 9, wherein analyzing the media stream further comprises utilizing, by a detection agent of the content processing device, a waveform monitor for detecting the potential quality defect of frozen frames and dropped frames and utilizing, by the detection agent, pattern recognition and matching for detecting the potential quality defect of pixilation.

17. A non-transitory computer-readable medium comprising a set of computer-executable instructions tangibly embodied thereon, the instructions comprising:

receiving, in a content processing device, a media stream via a network;

analyzing the media stream to detect whether an anomaly is present in the media stream indicative of a potential quality defect in playback of the media stream and to identify the nature of a detected anomaly;

providing data relating to the detected anomaly, which includes the nature of the detected anomaly, to a destination via the network; and providing loopback buffer contents along with data associated with the content processing device, as the data relating to the detected anomaly, when the nature of the anomaly cannot be identified.

18. The medium of claim 17, further including instructions to receive a request for data relating to the media stream from a monitoring server via the network, and to respond to the request by providing to the server data relating to the media stream.

19. The medium of claim 17, wherein analyzing the media stream for the anomaly indicative of the potential quality defect includes monitoring for at least one of dropped packets, delayed packets, occurrences where packets are received more slowly than packets are to be played back to a playback device, occurrences where no audio is received for a certain period of time, occurrences where a single frame of video is repeated for a period of time, and loss of an incoming signal.

20. The medium of claim 17, further comprising a second computer-readable medium that includes a second set of computer-executable instructions, the second set of instructions including instructions to receive the data relating to the detected anomaly via the network, wherein the monitoring server is the destination.

21. The medium of claim 20, the second set of instructions further including instructions to analyze the data to correlate the anomaly to an item in the network.

22. The medium of claim 20, wherein the second set of instructions further including instructions to provide a report relating to the anomaly.

23. The medium of claim 20, wherein a monitoring agent of the monitoring server at least one of determines the nature of the anomaly and creates a new anomaly classification, based on the data relating to the detected anomaly.

24. The medium of claim 17, wherein analyzing the media stream further comprises utilizing a waveform monitor for detecting the potential quality defect of frozen frames and dropped frames and utilizing pattern recognition and matching for detecting the potential quality defect of pixilation.

* * * * *